United States Patent
James et al.

(12) 
(10) Patent No.: US 6,694,517 B1
(45) Date of Patent: Feb. 17, 2004

(54) BROADBAND COMMUNICATION NETWORK WITH LOW POWER ADDRESSABLE TAP SYSTEM FOR CONTROLLING SUBSCRIBER ACCESS

(75) Inventors: Lewis Gregory James, Clarence Center, NY (US); John Douglas Page, Ridgeway (CA)

(73) Assignee: Diversified Control, Inc., Orchard Park, NY (US)

( * ) Notice: Subject to any disclaimer, the term of this patent is extended or adjusted under 35 U.S.C. 154(b) by 0 days.

(21) Appl. No.: 09/384,352

(22) Filed: Aug. 27, 1999

(51) Int. Cl.[7] .............................................. H04N 7/167
(52) U.S. Cl. ................... 725/127; 725/130; 725/149; 725/150; 713/310; 713/320
(58) Field of Search ................. 725/149, 150, 725/127, 128, 129, 130, 107, 116, 124, 125, 7; 333/7, 611; 709/7; 713/320, 310

(56) References Cited

U.S. PATENT DOCUMENTS

| | | | |
|---|---|---|---|
| 4,090,220 A | 5/1978 | Gargini | 358/86 |
| 4,354,167 A | 10/1982 | Terreault et al. | 333/103 |
| 4,360,828 A | 11/1982 | Briggs, Jr. et al. | 358/86 |
| 4,367,557 A * | 1/1983 | Stern et al. | 340/310.01 |
| 4,369,443 A | 1/1983 | Giallanza et al. | 340/825.47 |
| 4,443,815 A | 4/1984 | Hempell | 358/114 |
| 4,577,221 A | 3/1986 | Skinner, Sr. et al. | 358/86 |
| 4,577,224 A | 3/1986 | Ost | 358/114 |
| 4,686,564 A | 8/1987 | Masuko et al. | 358/86 |
| 4,710,956 A | 12/1987 | Rast | 380/20 |
| 4,755,776 A | 7/1988 | Preschutti | 333/100 |
| 4,912,760 A | 3/1990 | West, Jr. et al. | 380/7 |
| 4,937,865 A | 6/1990 | Barany | 380/7 |
| 4,991,206 A | 2/1991 | Blais | 380/7 |
| 5,020,129 A | 5/1991 | Martin et al. | 455/4 |
| 5,027,399 A | 6/1991 | Cordle et al. | 380/7 |
| 5,045,823 A | 9/1991 | Nichols, III | 333/132 |
| 5,311,325 A | 5/1994 | Edwards et al. | 348/5.5 |
| 5,331,412 A | 7/1994 | Farmer et al. | 348/5.5 |
| 5,355,410 A | 10/1994 | Blais et al. | 380/20 |
| 5,396,642 A | 3/1995 | Blais et al. | 455/1 |
| 5,614,939 A | 3/1997 | DeBalko | 348/6 |
| 5,686,767 A * | 11/1997 | Helfrich et al. | 307/64 |
| 5,764,734 A * | 6/1998 | Medendorp et al. | 379/90.01 |
| 6,459,376 B2 * | 10/2002 | Trosper | 340/571 |

* cited by examiner

Primary Examiner—John Miller
Assistant Examiner—Nathan A Sloan
(74) Attorney, Agent, or Firm—Walter W. Duft

(57) ABSTRACT

A broadband telecommunication network (such as a cable television distribution system) includes a plurality of switching units (such as taps) controlling subscriber access to the network. The switching units are controlled from a central location (such as a head end) using minimal network transmission medium power. A repeating sequence of switching unit control messages is sent from the central location across the network. Each of the messages is addressed to an individual one of the switching units. Each switching unit is periodically powered up from a low power sleep state to a higher power operational wake state in synchronization with a corresponding one of the control messages being sent from the central location. After a switching unit's corresponding control message is processed, the switching unit is returned to the lower power sleep state.

23 Claims, 9 Drawing Sheets

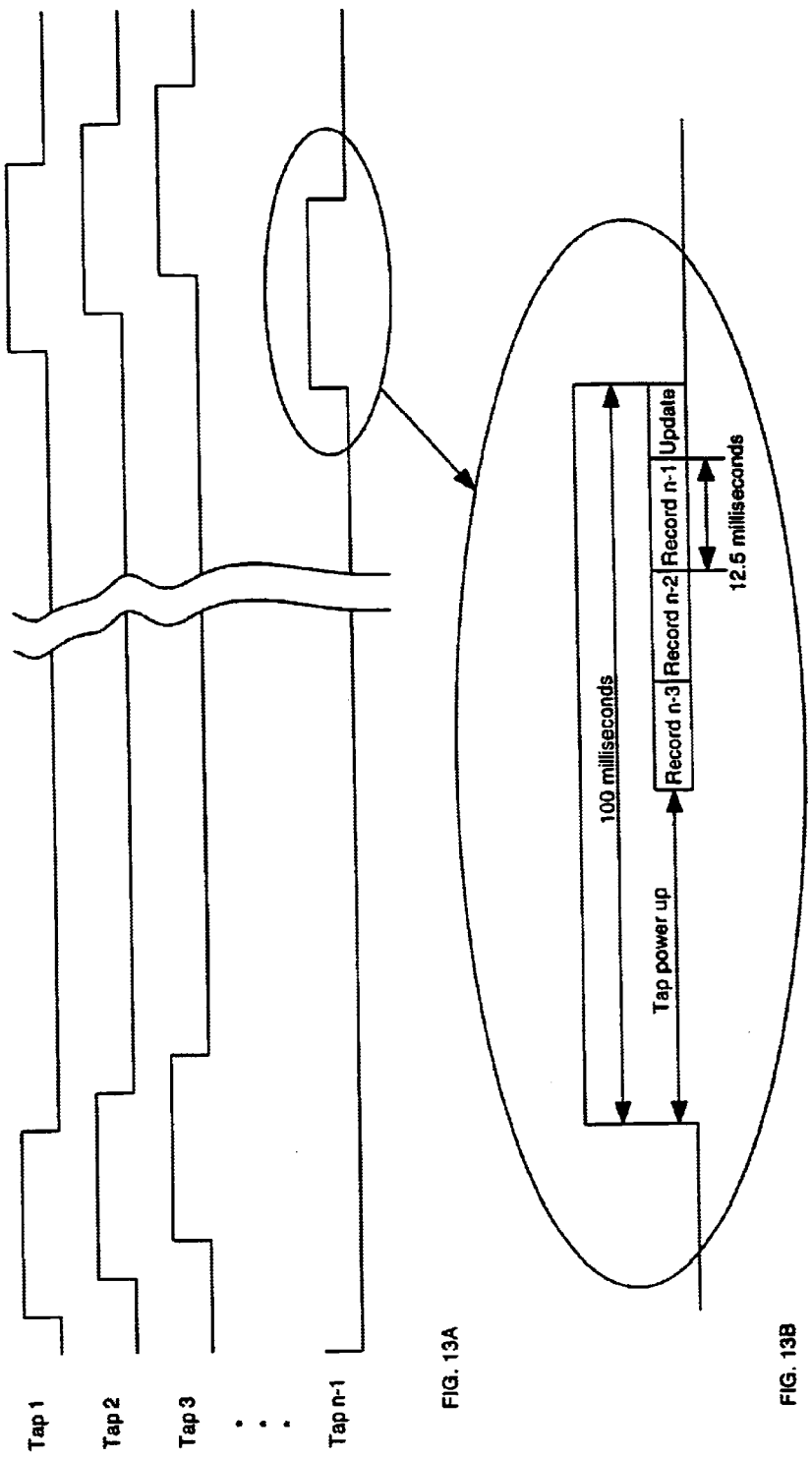

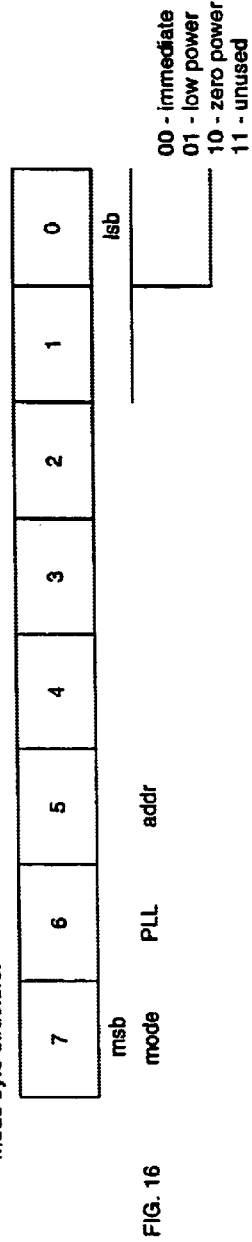
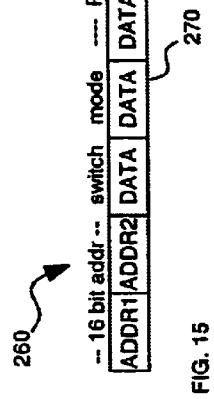
FIG. 14
FIG. 15
FIG. 16
FIG. 17

BROADBAND COMMUNICATION NETWORK WITH LOW POWER ADDRESSABLE TAP SYSTEM FOR CONTROLLING SUBSCRIBER ACCESS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to broadband communication networks, and particularly to cable television distribution systems.

2. Description of the Prior Art

A cable television distribution system is a species of broadband communication network in which subscriber connectivity is controlled through the use of radio frequency transmission line taps. Such taps are typically mounted on telephone poles or in ground-mounted housings where they are relatively inaccessible. Each tap usually has multiple ports that are each connectable to a lead-in cable or "drop" that extends from the tap port to a subscriber's premises. By way of example, one tap may have four ports serving four subscribers, eight ports serving eight subscribers, and so on. In a typical cable television distribution system, there may be as many as one-half million or more subscribers requiring as many as one hundred and twenty-five thousand or more taps.

Traditionally, cable television subscriber connectivity is controlled by physically connecting and disconnecting the subscriber's lead-in cable to and from the tap port. This operation requires that a cable company employee travel to the subscriber premises location and either utilize a power lift device, if the tap is mounted on a telephone pole, or a special key, if the tap is mounted inside a locked housing. In even a modest size cable television distribution system, the cost of such tap connection servicing can be quite high. Moreover, this scheme allows unauthorized cable connections to be made by those agile enough to climb telephone poles or resourceful enough to open the locks on cable housings.

As a response to this dilemma, a species of tap has been proposed that allows subscriber connectivity to be controlled remotely from the cable operator's head end office. The ports in such taps remain connected to the subscriber premises lead-in cables, but the ports are switchable inside the tap via control signalling transmitted by the cable operator. Because each tap is assigned an address for distinguishing its control signals from other control signals generated for other taps, this species of tap is commonly referred to as an addressable tap.

A significant disadvantage of prior art addressable taps is that the message processing and switching circuitry incorporated into each tap must be powered by battery or by the transmission medium (cable plant) carrying the rf signals. Powering by battery is not desirable because batteries must be periodically replaced. Using line power is a better solution but is expensive because the power requirements of the tap circuitry exceed the power levels used to drive the rf signal amplifiers and other transmission line equipment. Thus, additional power supply equipment must be added to the cable plant.

Accordingly, there is a need in a broadband communication network for a system and a method of controlling subscriber access from a central location, without having to increase transmission line power levels. What is particularly required is an improved, low power addressable tap system for a cable television distribution system that facilitates head end control of subscriber connections using existing transmission line power supply resources.

SUMMARY OF THE INVENTION

A novel system and method are proposed for use in a broadband telecommunication network that includes a plurality of switching units, such as addressable taps, controlling subscriber access to the network. The inventive system and method solve the above-described problems by controlling the switching units from a central location using minimal network transmission medium power. In accordance with the inventive system and method, a repeating sequence of switching unit control messages is sent from the central location across the network. Each of the messages is addressed to an individual one of the switching units. Each switching unit is periodically powered up from a low power "sleep" state to a higher power operational "wake" state in synchronization with a corresponding one of the control messages being sent from the central location. After each switching unit's corresponding control message is processed, the switching unit is returned to its lower power sleep state.

In preferred embodiments of the invention, the broadband telecommunication network is a cable television distribution system including (1) a head end, (2) at least one transmission line carrying communications from the head end, and (3) a plurality of taps connected to the transmission line(s) and containing switchable ports connecting to cable subscribers. A tap record generating circuit is provided in the head end for generating a repeating sequence of tap records. Each tap record is addressed to a specific one of the taps and contains information for controlling the state of the port switches. A tap control circuit is provided in each of the taps. Each tap control circuit includes a low power stage and a higher power stage. The low power stage is configured to control the higher power stage by maintaining it in a sleep state until a corresponding tap record is about to be sent from the head end. The low power stage then wakes up the higher power stage so that it can process the tap record. The higher power stage is configured to read tap records as they arrive from the head end and to identify a corresponding tap record. The higher power stage processes the tap record and takes responsive action (e.g., setting the tap port switches) as necessary in accordance with the tap configuration information contained in the tap record. The higher power stage then calculates a time interval for reawakening and provides the time interval to the lower power stage, whereupon the higher power stage puts itself to sleep.

BRIEF DESCRIPTION OF THE DRAWING

The foregoing and other features and advantages of the invention will be apparent from the following more particular description of a preferred embodiment of the invention, as illustrated in the accompanying Drawing, in which:

FIG. 11 is a diagrammatic illustration showing exemplary rates of information generated by the head end control unit of FIG. 2;

FIG. 12 is another diagrammatic illustration showing exemplary time durations of information generated by the head end control unit of FIG. 2;

FIG. 13A is a diagrammatic illustration showing exemplary operational timings for multiple taps containing the tap control circuit of FIG. 3;

FIG. 13B is a detailed view of a portion of FIG. 13A showing details of an exemplary "wake state" timing interval for a single tap containing the tap control circuit of FIG. 3.

FIG. 14 is a diagrammatic illustration of an exemplary nonvolatile data storage memory that could be implemented in a tap to hold tap configuration information;

FIG. 15 is diagrammatic illustration of an exemplary alternative tap record that could be generated by the head end control unit of FIG. 2;

FIG. 16 is a diagrammatic illustration showing an exemplary tap "mode" byte contained in the alternative tap record of FIG. 15; and FIG. 17 is a diagrammatic illustration showing an exemplary "broadcast" record that could be generated by the head end control unit of FIG. 2 for transmission to all taps in the cable television distribution system of FIG. 1.

DETAILED DESCRIPTION OF THE PREFERRED EMBODIMENT

Figure 1:
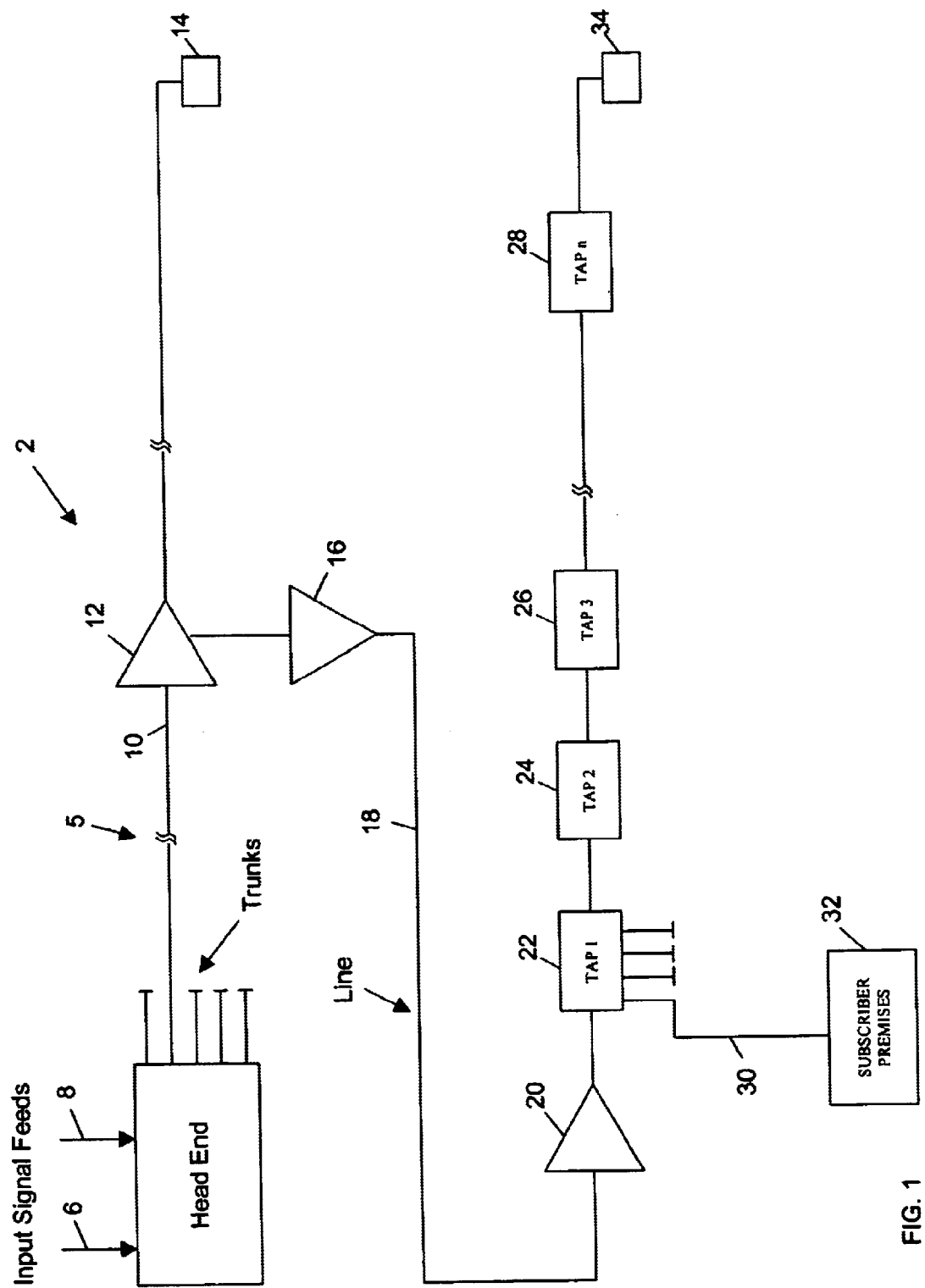
FIG. 1 is a block diagram showing a cable television distribution system configured in accordance with the present invention.

Turning now to the figures, wherein like reference numerals represent like elements in all of the several views, FIG. 1 illustrates an exemplary cable television distribution system ("cable system") 2 representing one possible embodiment of a broadband telecommunication network constructed in accordance with the invention. The cable system 2 includes the usual head end 4 receiving one or more input rf television signal feeds, such as feeds 6 and 8. The head end 4 combines or multiplexes the input rf signals onto a cable plant 5 that comprises a network of cable distribution trunks, such as the trunk 10, for distribution to cable television subscribers. As is conventional, the cable plant trunks can be implemented using 75 ohm coaxial cable or the like.

To counteract signal losses resulting from electrical resistance, dielectric capacitance, signal radiation, and feeder line draw-off, radio frequency (rf) trunk amplifiers, such as the trunk amplifier 12, are spaced periodically along the trunks to provide rf signal amplification. To minimize signal reflections, each trunk is terminated at an impedance-matched cable termination, such as the cable termination 14 terminating the trunk 10.

Some of the trunk amplifiers, including the trunk amplifier 12, connect to bridger amplifiers, such as the bridger amplifier 16, that amplify and route rf signals from the head end 4 onto a plurality of feeder lines, such as the line 18. Each feeder line serves a limited subscriber area, such as a street or neighborhood. Like the trunks, the feeder lines can be implemented using 75 ohm coaxial cables or the like. Each feeder line typically includes one or more rf distribution (extender) amplifiers, such as the distribution amplifier 20. Like the trunk amplifiers described above, the feeder line distribution amplifiers counteract resistive, capacitive and radiant cable losses, as well as losses arising from subscriber signal draw-off.

Subscriber signal feeds are provided through a plurality of addressable taps, such as the taps 22, 24, 26 and 28, each of which contains switchable ports, and thus functions as a switching unit, for controllably routing rf signals to cable system subscribers. More particularly, the taps connect to a plurality of drops, such as the drop 30, that each provide rf signals to a single subscriber premises, such as the subscriber premises 32. To minimize signal reflections, each feeder line terminates at an impedance-matched line termination, such as the line termination 34.

Figure 2:
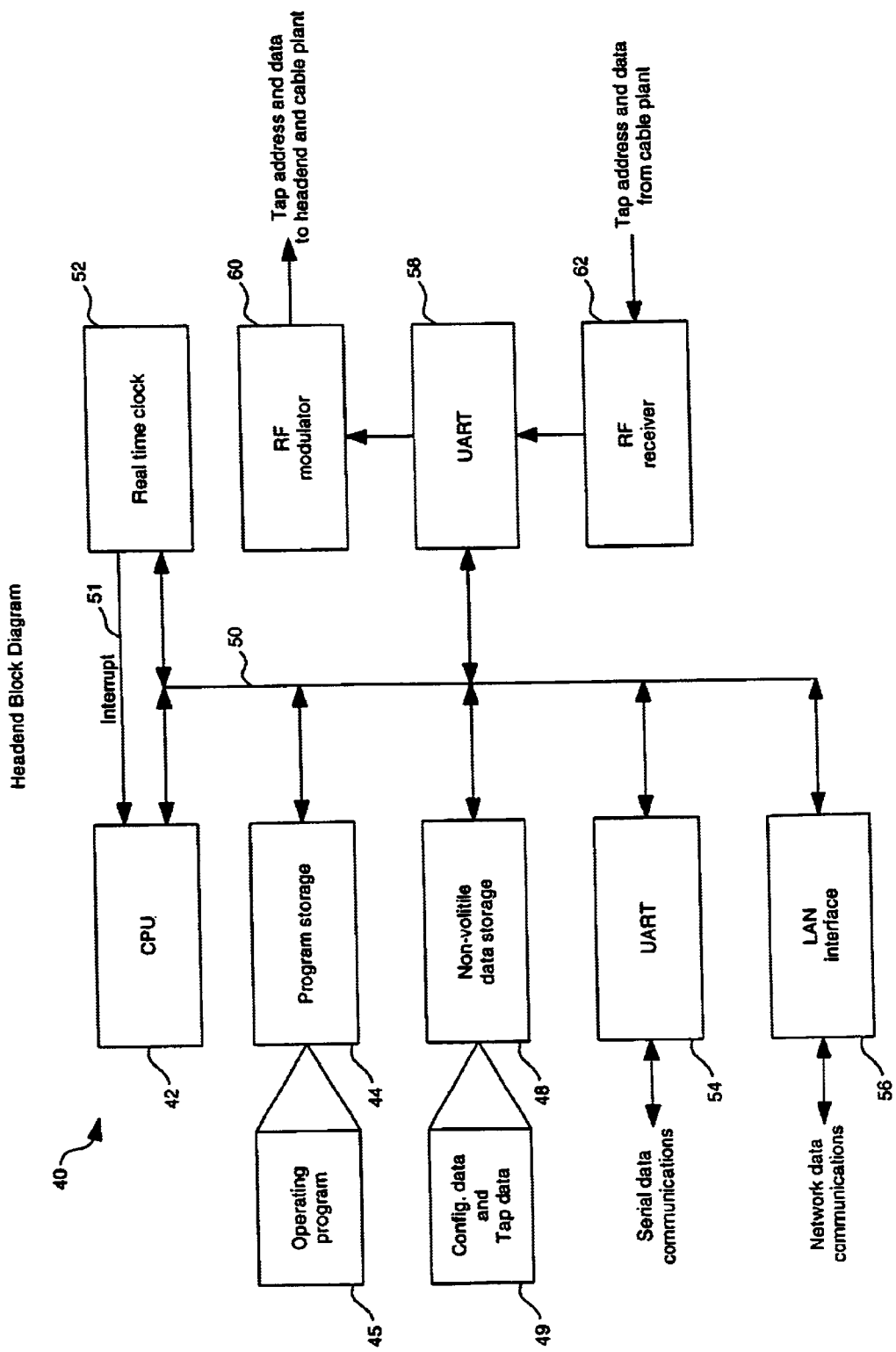
FIG. 2 is a block diagram showing a head end control unit for controlling a plurality of taps served by one or more rf transmission trunks in the cable television distribution system of FIG. 1.

Turning now to FIG. 2, the head end 4 of the cable system 2 is associated with a head end control unit 40 whose principal function in accordance with the invention is to provide a tap record generating circuit for controlling the port switching in the above-described addressable taps. To that end, the head end control unit 40 is programmed to generate a repeating sequence of tap control messages, referred to hereinafter as "tap records," each of which is addressed to a corresponding tap. As described in more detail below, each tap record includes a tap address along with data that specifies the settings of the tap switching circuitry. The tap records can be distributed from the head end 4 on all of the cable plant trunks, or on a selected trunk subgroup, depending on the requirements of the cable system operator. The tap records are preferably transmitted as frequency modulated (FM) rf signals. To avoid interference with the television channel traffic, the tap records can be transmitted on an unused portion of the rf spectrum, such as the guard band between television channels 4 and 5. Advantageously, not more than about 30 Khz bandwidth is required to carry the tap records, such that other data transmissions may also be placed in the aforementioned guard band.

Operations of the head end control unit 40 are managed by a programmable computer that includes a CPU (central processing unit) 42, a program storage memory (e.g., an EEPROM) 44 storing an operating program 45, and a nonvolatile data storage memory (e.g., a battery back-up RAM) 48 storing head end configuration and tap data 49. As is conventional in the programmable computer art, communication between these control unit elements is facilitated by a shared bus 50. As is further conventional, requests for CPU service are initiated via interrupts, including the interrupt 51 used by a real time clock 52 to synchronize the generation of tap records by the CPU 42 for transmission to the cable system taps.

The head end control unit 40 may additionally include a first UART (universal asynchronous receiver transmitter) 54 to facilitate serial data communications between the head end control unit 40 and other head end (or remote) equipment (such as a billing system), and a LAN (local area network) 56 to facilitate network communications between the head end control unit 40 and other head end (or remote) equipment (such as a billing system). A second UART 58 operates in conjunction with an RF modulator 60 and an RF receiver 62 to communicate tap records generated by the CPU 42 (from the tap data stored in the nonvolatile data storage memory 48) to and from the head end 4 (and the cable plant 5). The tap records sent to the head end 4 are placed on the cable plant 5 for transmission to the cable system taps. Tap records received from the cable plant 5 can be used for diagnostic purposes as part of a loop-back monitoring mode. Additional operations of the head control unit 40 are described in more detail below.

Figure 3:
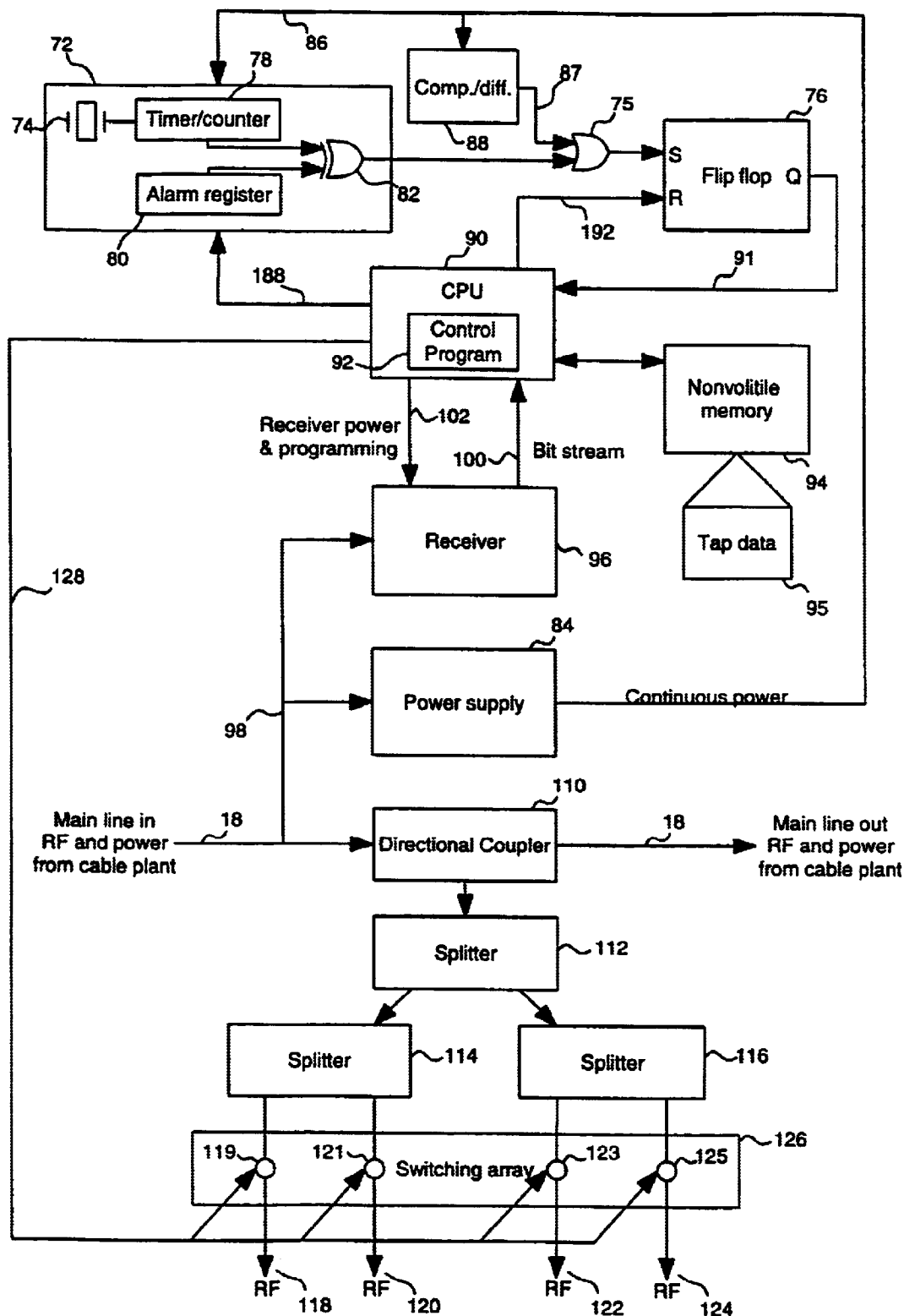
FIG. 3 is a block diagram showing an addressable tap control circuit for controlling subscriber connectivity in response to head end messages in the cable television distribution system of FIG. 1.

Turning now to FIG. 3, each addressable tap in the cable system 2 is equipped with a tap control circuit 70 whose principal function in accordance with the invention is to control the addressable tap to receive tap records from the head end 4 and activate or deactivate specified tap ports in accordance with the tap configuration information contained in a tap record corresponding to the addressable tap. In order to minimize power consumption, each tap control circuit 70 maintains itself in a low power "sleep" state during periods when no corresponding tap record is being sent from the head end 4. Each tap control circuit 70 then periodically powers up from the sleep state to a higher power operational "wake" state in sequence with a corresponding one of the tap records being sent from the head end 40. After the corresponding tap record for the associated addressable tap is processed, the tap control circuit 70 returns to the sleep state.

Each tap control circuit 70 includes a low power stage that operates during the sleep state, and a higher power stage that operates during the wake state. In the exemplary embodiment of FIG. 3, the low power stage includes a timing circuit 72, an oscillator 74, an OR gate 75, and an RS flip flop 76 (other triggering devices could also be used). The timing circuit 72 includes a timer/counter 78, an alarm register 80 and a comparator 82. The timer/counter 78 is driven by the oscillator 74 to continuously count to a predetermined value (e.g., 65,536), reset to zero, and then restart the counting process. The output from the timer/counter 78 is provided to one input of the comparator 82. Although not shown in FIG. 3, the output from the timer/counter 78 is a multi-bit word (e.g., sixteen bits) and the comparator 82 is a bitwise comparator (e.g., an array of AND gates, Exclusive-NOR gates or the like). The alarm register 80 is programmed with a count value that is provided to the second input of the comparator 82. When the timer/counter 78 counts to the count value stored in the alarm register 80, the comparator 82 outputs an alarm interrupt ("wake-up") pulse. The wake-up pulse is provided to one input of the OR gate 75, and the output of the OR gate 75 is provided to the "S" input of the RS flip flop 76. This causes the "Q" output of the RS flip flop 76 to go high. When that occurs, continuous power from a power supply 84, which is fed to both the timer circuit 72 and the RS flip flop 76 on power feed line 86, is passed to the power supply input of a CPU 90 on line 91.

The other input to the OR gate 75 is a power pulse carried on a power feed line 87 from the power supply 84. This pulse is generated by a comparator/differentiator circuit 88 in the power supply 84 whenever power resumes following a power interruption to the cable plant 5. The power pulse drives the tap circuit 70 into the wake state such that, following a power interruption, the tap can be reconfigured (as necessary) as part of its resynchronization to the signaling on the cable system 2.

In the exemplary embodiment of FIG. 3, the higher power stage of the tap control circuit 70 includes the CPU 90, which is periodically powered up into an operational state by the low power stage described above. The CPU 90 is managed by a control program 92 stored internally in the CPU 90 (e.g., a one-time programmable micro-computer memory). A separate nonvolatile memory 94 (e.g., a 32 byte EEPROM) stores tap data 95 containing various tap configuration information. More particularly, as shown in FIG. 14, the nonvolatile memory 94 may, by way of example only, store two bytes of tap address information, one byte of tap port switch configuration information, one byte of tap mode information (described in more detail below), and four bytes of tap record frequency (PLL) information.

The higher power stage of the tap control circuit 70 further includes an rf receiver 96. The rf receiver 96 receives tap records from a feeder line, such as the line 18, via an rf signal line 98. It demodulates the rf signal and outputs the analog tap records in digital form on a bit stream line 100 to the CPU 90. It will be seen that the rf signal line 98 also provides power to the power supply 84. Although the same power signal is carried on the rf signal line 98 to the rf receiver 96, it is preferred that the rf receiver's power be controllably provided by the CPU 90 via the power portion of power and programming lines 102.

The remaining components shown in FIG. 3 are conventional in nature. They include a directional coupler 110 connected to a feeder line, such as the line 18. The directional coupler 110 operates in conjunction with splitters 112, 114 and 116 to divert rf signals from the head end 4 to a plurality of tap ports 118, 120, 122, 124, through respective switches 119, 121, 123 and 125 of a switching array 126. The switches are set via control signaling provided by the CPU 90 on a control signaling pathway 128.

Figure 4:
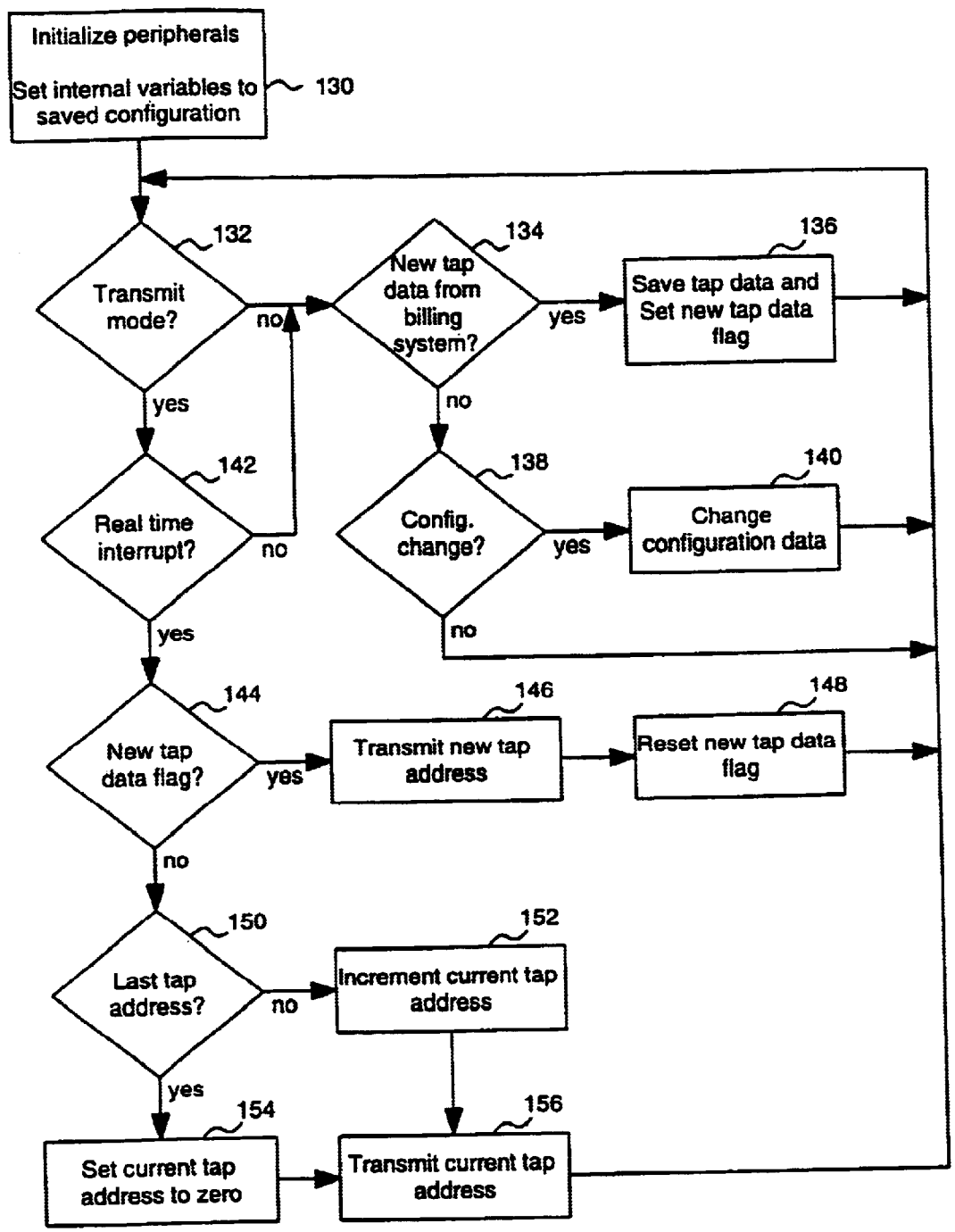
FIG. 4 is a flow diagram showing method steps performed by the head end control unit of FIG. 2.
Figure 5A:
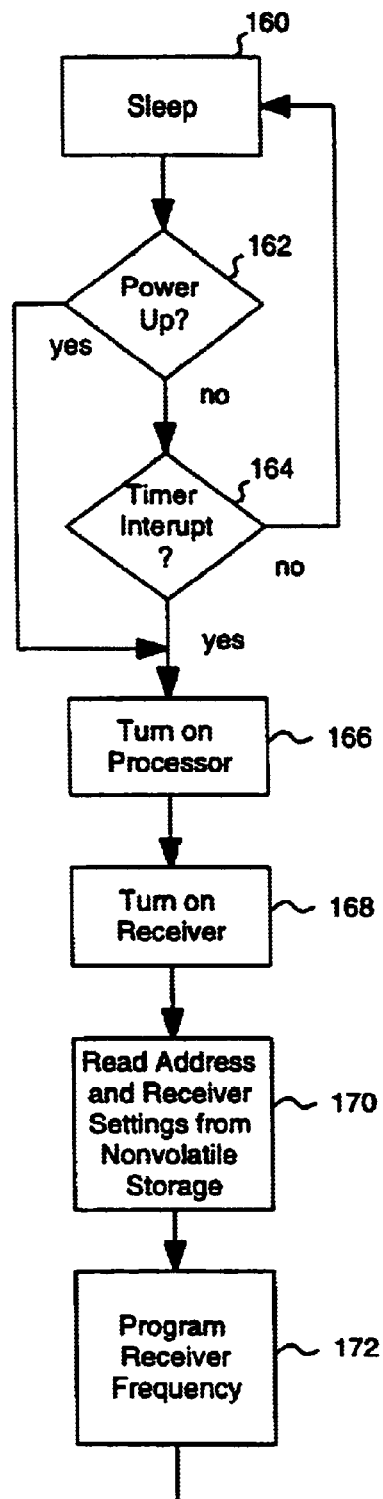
FIG. 5A is a first portion of a flow diagram showing method steps performed by the tap control circuit of FIG. 3.
Figure 5B:
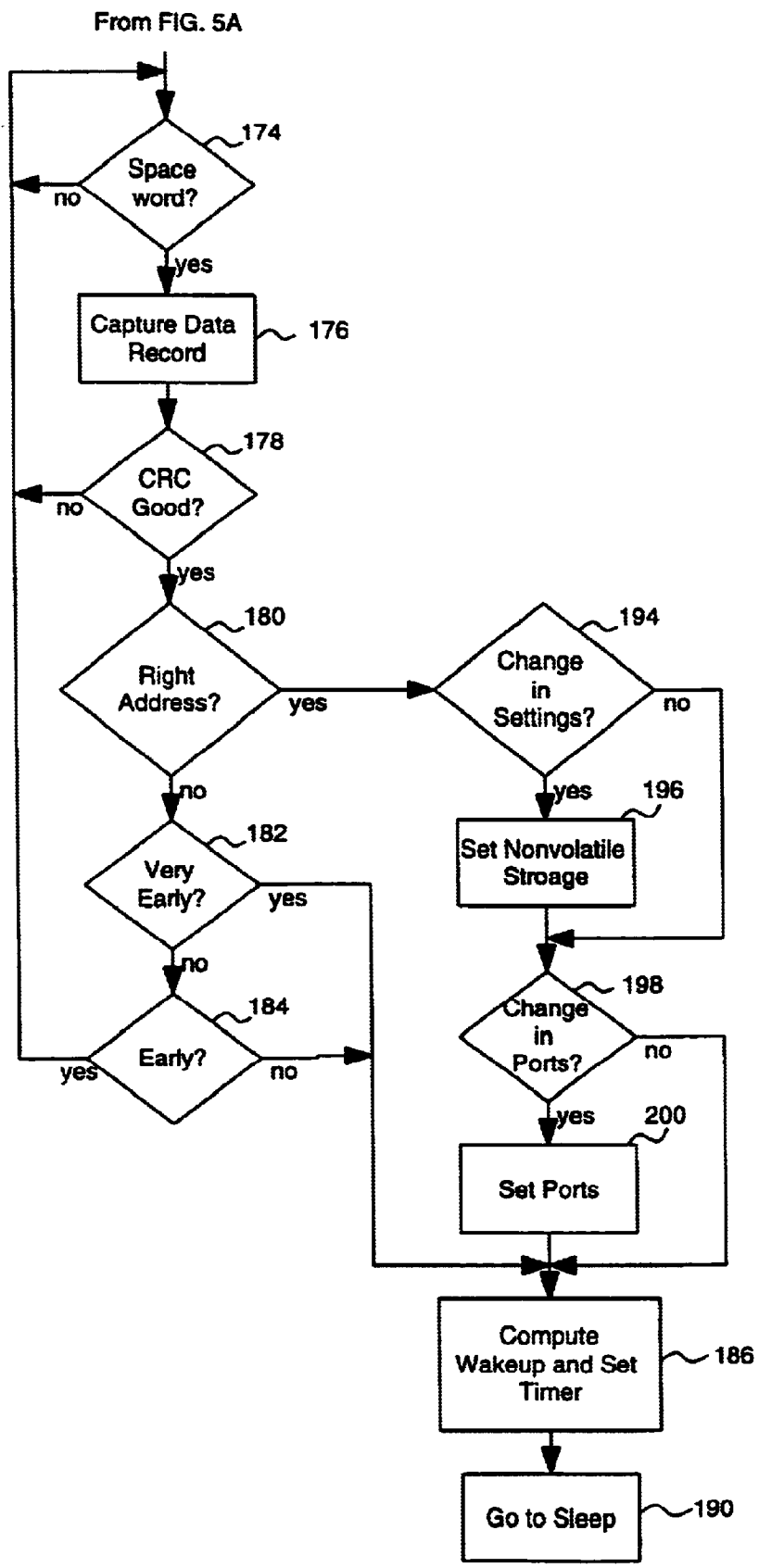
FIG. 5B is second portion of a flow diagram showing method steps performed by the tap control circuit of FIG. 3.

Turning now to FIGS. 4, 5A and 5B, the operations of the head end control unit 40 and the tap control circuit 72 will be respectively described. As shown in FIG. 4, following power-up, the first action taken by the head end control unit 40 in step 130 is to initialize the various control unit peripherals 44, 48, 52, 54, 56, 58, 60 and 62, and then set the internal programming variables of the CPU 42 in accordance with the configuration information saved in the nonvolatile data storage memory 48. This initialization information may include the tap record transmission frequency, the transmission signal level, and the data rate. Other information may also be included. When initialization is complete in step 130, tap record generation and transmission may proceed. Summarizing in advance, this processing entails generating a repeating sequence of tap records from the tap data stored in the nonvolatile data storage memory 48, and sending the tap records to the head end 4 for transmission over the cable plant 5. The stored tap data may include, for each tap managed by the head end control unit 40, a tap address along with various tap configuration information, such as the tap port settings, the tap record transmission frequency, and the tap mode. Other information may also be included for controlling other aspects of tap operation.

As part of each tap record generation and transmission cycle, a test is performed in 20 step 132 to determine whether the tap record transmit mode is in effect. Although the control unit 40 will normally operate in the tap record transmit mode on a continuous basis, it will occasionally be taken out of the transmit mode by a cable system operator. This may be done, for example, to allow new tap records to be added, existing tap records to be removed, and tap configuration information to be changed. In other cable systems, such configuration modifications will be performed "on-the-fly" without disabling the transmit mode.

If there is a negative determination in step 132, control proceeds to step 134. In step 134 a test is made to determine whether new tap data has been received by the control unit 40 (e.g., at the serial communication UART 54 or the LAN interface 56). Typically, such data would be sent from a billing system (not shown) or other equipment used to manage the cable system 2. If step 134 produces a positive result, the new tap data is written to the nonvolatile data storage memory 48. A "new tap data" flag is then set in step 136 and control returns to step 132. If no new tap data is detected in step 134, a test is made in step 138 to determine whether new head end configuration data has been received by the control unit 40. If so, the new configuration data is stored in the nonvolatile data storage memory 48. After storing the new configuration data in step 140, or if no new configuration data is detected, control passes to step 132. If the transmit mode is in effect, control then passes to step 142.

In step 142, the head end control unit waits for the real-time clock 52 to generate its timing interrupt 51. When the interrupt 51 is received, the head end control unit 40 tests, in step 144, whether the new tap data flag has been set. If it has, the tap record for the reconfigured tap is immediately sent to the head end 4 for transmission on the cable plant 5 in step 146. Note that this tap record is sent even though it may be out of sequence. This ensures that the tap will be reconfigured quickly, so that, if necessary, field personnel can check for rf signals to new subscribers without having to wait for an entire tap record sequence to be transmitted. Following transmission of the out-of-turn tap record in step 146, the new tap data flag is reset in step 148 and control returns to step 132.

If the new tap data flag is not set, a test is made in step 150 to determine whether the tap address contained in the most recently generated tap record is the "last" tap address in the sequence of tap records that the head end control unit 40 generates. This allows the head end control unit 40 to determine when the end of its tap record sequence has been reached, so that the sequence can be repeated. If the last tap address is not detected in step 150, the current tap address is incremented in step 152. If the test in step 150 is positive, indicating that the last generated tap record is the last tap record in the sequence, the current tap address is set to zero in step 154. In step 156, a tap record containing the current tap record address is generated and sent to the head end 4. Control then returns to step 132.

Turning now to FIGS. 5A and 5B, each tap control circuit 70 in the cable system 2 begins its processing in the low power sleep state in step 160. Step 162 represents a power interrupt situation wherein a power interruption and subsequent power resumption in the cable system 2 causes the comparator/differentiator circuit 88 to generate a power pulse on the power feed line 87. This causes the "Q" output of the RS flip flop 76 to go high and the CPU 90 to be powered-up without having to wait for the timer circuit 72. If a power interrupt has not occurred, the tap control circuit 70 remains in the sleep state in step 164 until the output of the comparator 82 goes high. When it does, the CPU 90 is powered up in step 166 via the "Q" output of the RS flip flop 76. The CPU 90, in turn, powers up the rf receiver 96 in step 168 via the receiver power portion of the power and programming lines 102. In step 170, the CPU 90 consults the tap data 95 in the nonvolatile memory 94 and reads the tap address and tap record transmission frequency settings contained therein. In step 172, the tap record transmission frequency settings are used to tune the rf receiver 96.

Turning now to FIG. 5B, the CPU 90 begins processing the digital tap record information carried on the bit stream line 100. More specifically, in step 174, the CPU 90 tests for a space word (all zeros), which, as described in more detail below, is used to signify the end of one tap record and the beginning of the next. If a space word is detected in step 174, the CPU 90 reads the tap record immediately following the space word in step 176. In step 178, the CPU 90 performs CRC (cyclic redundancy checking) or other suitable error checking on the tap record. If the data is good, control passes to step 180 and the CPU 90 compares the address of the received tap record with the actual tap address previously retrieved from the nonvolatile data storage memory 94 in step 170.

If the received tap address and the actual tap address do not correspond in step 180, the CPU 90 performs a test in step 182 to determine whether the received tap address is very early, i.e., whether it is less than the actual tap address by a predetermined minimum differential. If the received tap address is not very early, another test is performed in step 184 to determine if the received tap address is early at all, i.e., if it is less than the actual tap address. If the received tap address is early, but not very early, control returns to step 174 to check the next received tap address. If the received tap address is found to be either very early in step 182, or not early in step 184 (i.e., the correct tap address was missed), control proceeds to step 186. At this point, the CPU 90 will not remain in the wake state to wait for the correct tap address to be sent, as to do so would waste power. Instead, the CPU implements step 186 by computing the time when the correct tap address will be sent and by setting the timer 72. The latter is accomplished by storing an appropriate count value in the alarm register 80 via the control line 188. The CPU then puts itself to sleep in step 190 by providing a high output to the "R" input of the RS flip flop 76 on the control line 192. This causes the "Q" output of the RS flip flop 76 to reset to the low state, thus cutting off the power signal to the CPU 90 that is carried on the power feed line 91.

If in step 180, the received tap address is correct, control passes to step 194 and the CPU 90 compares the received tap record against the tap data 95 to determine whether any changes have been made to the tap configuration settings, such as the tap address, the tap port settings, the tap mode, or the tap record transmission frequency. If any of these settings have changed, the tap data 95 is updated with the new information and written to the nonvolatile memory 94 in step 196. Thereafter, or if no change in the tap configuration settings was detected, control passes to step 198. In step 198, the CPU 90 tests for a change in the tap port settings, signifying that rf signal access to a particular subscriber premises is being activated or deactivated. If a change in the tap port settings is detected, step 200 is implemented and the CPU 90 sends appropriate control signals on the control line 128 to the switching array 126. Thereafter, or if no change is detected in the tap port settings in step 198, control passes to steps 186 and 190. As described above, the CPU 90 calculates a new wake-up time and sets the timing circuit 72 by programming the alarm register 80 via the control line 188.

Figure 6:
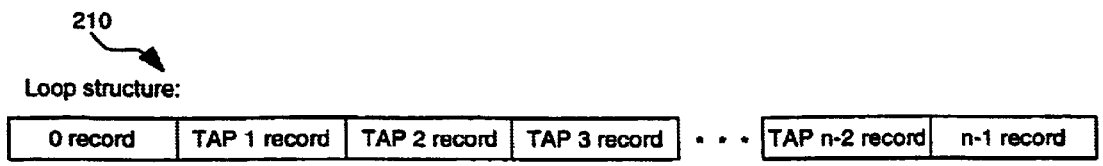
FIG. 6 is a diagrammatic illustration of an exemplary sequence of tap records generated by the head end control unit of FIG. 2.
Figure 7:
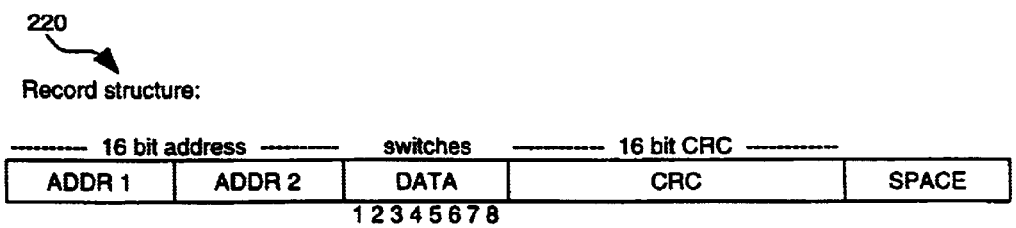
FIG. 7 is a diagrammatic illustration of an exemplary tap record generated by the head end control unit of FIG. 2.
Figure 8:
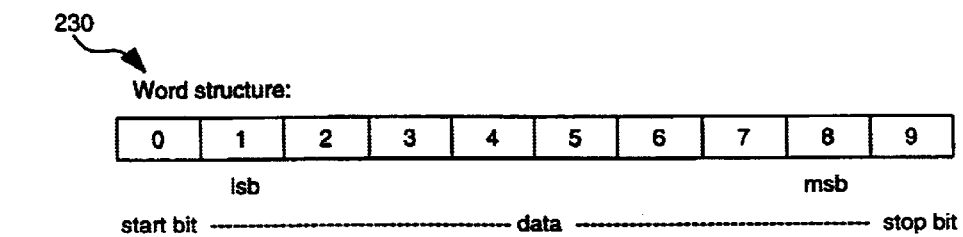
FIG. 8 is a diagrammatic illustration of an exemplary byte carried in a tap record generated by the head end control unit of FIG. 2.

Turning now to FIGS. 6–12, exemplary structures for the tap records 46 transmitted by the head end 4, along with possible timings relative thereto, are illustrated. FIG. 6 illustrates an exemplary sequence 210 of tap records having tap addresses that successively increment from zero through n−1. FIG. 7 illustrates an exemplary structure for a single tap record 220 transmitted by the head end 4. The tap record 220 is shown as including six information words. The first two words contain a 16 bit tap address; the third word contains eight tap port configuration bits capable of setting up to eight tap port switches; the fourth and fifth words contain 16 CRC bits; and the sixth word is the above-described space word. Note that two or more tap port configuration words could be used for taps containing more than eight ports. For example, two words with eight configuration bits each could set up to 16 ports, three words with eight configuration bits each could set up to 24 ports, and so on. FIG. 8 illustrates an exemplary word structure 230 for the tap record 220. It contains 10 bits; namely, a start bit, eight data bits arranged from the least significant bit (lsb) to the most significant bit (msb), and a stop bit.

Figure 9:
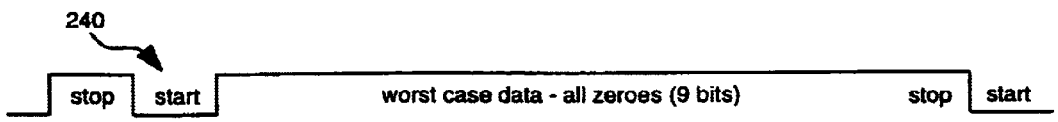
FIG. 9 is diagrammatic illustration of the voltage levels in an exemplary byte of zero value data in a tap record generated by the head end control unit of FIG. 2.
Figure 10:
FIG. 10 is diagrammatic illustration of the voltage levels in an exemplary "space" byte in a tap record generated by the head end control unit of FIG. 2.

FIGS. 9 and 10 illustrate a mechanism for distinguishing between a space word and a worst case zero value data word during the space word test implemented in step 174 of FIG. 5B. In the data word 240 of FIG. 9, there is a stop bit for the previous word, followed by a start bit for the current word, followed by a maximum of 8 consecutive zero data bits and a stop bit, for a total of 9 consecutive zero bits. For the space word 250 of FIG. 10, there is no start bit and the stop bit for the previous word is followed by 10 consecutive zero bits, for a total of 11 consecutive zero bits. Thus, by waiting 9.5 bits for the space word, the space word can be distinguished from the worst case data word.

FIG. 11 illustrates possible timings for the tap record transmission sequence described above. Assuming the UART 58 in the head end control unit 40 outputs tap record data at the baud rate of 4800, there will be an output of 480 bytes/second if the 10-bit word structure 230 is used. This will yield 80 records/second if the 6-word tap record structure 220 is used, 4800 records/minute, and 288,000 records per hour. In FIG. 12, it is assumed that a single bit requires 0.208 milliseconds. At 10 bits per word, the word (byte) time will be 2.083 milliseconds. At 6 bytes/record, the record time will be 12.500 milliseconds. If it is assumed that there are two bytes available for tap addresses, it would be possible to address up to 65,536 ($2^{16}$) taps on each frequency being used for tap record transmission. A single pass through all tap records contained in a tap record sequence may be referred to as a "loop." If there are 64,536 tap records/loop, the total loop time for a complete sequence (loop) of tap records to be sent would be 13.654 minutes. It will be appreciated that many other timing schemes could be used, depending on system configuration and operational requirements.

It is expected that one head end control unit 40 will be used for each tap record transmission frequency, and that one head end control unit 40 will typically manage 65,536 taps. If each tap has eight ports, a single head end control unit 40 could serve 524,288 subscriber premises, each of which could, by way of example, be updated every 13.654 minutes. To manage additional taps, additional head end control units 40 and tap record transmission frequencies may be used. Again, many alternative configurations could be implemented.

FIGS. 13A and 13B illustrate an exemplary wake state timing sequence and interval, respectively, for an exemplary set of taps 1 through n−1. As shown in FIG. 13B, the wake state for a tap begins with an initial power up phase, followed by a tap record receive phase that lasts, by way of example, for three tap record reads, followed by a tap update period. Using the timing information of FIGS. 11 and 12, the total elapsed time for the tap wake state would be on the order of 100 milliseconds. Although FIG. 13B shows three tap records being evaluated to account for timing inaccuracies, it would be possible to examine fewer tap records during the tap wake state if sufficient timing synchronization can be achieved.

As can be seen in FIG. 13A, each tap wake up period is staggered. The amount of staggering can be as little as the time it takes to send one record (e.g., 12.5 milliseconds). Thus, whereas the tap in FIG. 13B wakes up to read tap records, n−3, n−2 and n−1, the next tap that wakes up would read tap records, n−4, n−3 and n−2, and so on. If each tap record lasts 12.5 milliseconds, and if the total tap wake time is 100 milliseconds (as shown in FIG. 13B), a total of only eight (100/12.5=8) taps would need to be awake at any given time. It is contemplated that each tap will consume no more than approximately 15 milli-amps during the wake state. During the sleep state, current consumption will generally vary between approximately 2–3 orders of magnitude less than the wake state current consumption (e.g., between about 15 micro-amps if a latching relay switching array 126 is used and 100 micro-amps if a solid state switching array 126 is used). For an addressable tap system containing 65,536 taps, eight of which are awake at any given time, and assuming a wake state current consumption of 15 milli-amps per tap and a sleep state current consumption of 15 micro-amps per tap, the total current consumption in milli-amps would be I=[(8×15)+(65,528×0.015)]=1.1 amps. If the sleep state current consumption is 100 micro-amps per tap, the total current consumption would be I=[(8×15)+(65,528×0.100)]=6.7 amps. It will thus be appreciated that the total tap-related power drain on the cable system 2 is insignificant in comparison to prior art addressable tap systems wherein all taps remain on full power.

Other power modes may be implemented to further reduce power consumption. For example, in addition to the "low" power mode described above, a "zero" power mode could be used that draws no line power, at least during the sleep state, such that the taps are self powered. This mode could be implemented, by way of example, using a solar activated power source on each tap to provide sleep state power. Wake state power would preferably still be provided by the cable plant 5. In order to minimize the solar power used during the sleep state, the taps could be programmed to awaken less frequently than once every tap record transmission sequence (loop). For example, the taps could wake up every 10 loops, every 100 loops, every 24 hours, etc.

FIGS. 15 and 16 illustrate an exemplary alternative tap record 260 and mode byte 270, respectively, that can be used to set the tap mode. The tap record 260 of FIG. 15 includes the same information as the tap record 220 of FIG. 7, together with additional bytes for specifying the tap mode, the tap record transmission frequency, the tap address, etc. The mode byte 270 of FIG. 16 is contained in the tap record 260. It can be used to select the above-described low power and zero power modes. Other modes, such as an immediate power mode that keeps the tap in an awakened state until further notice, can also be specified.

FIG. 17 illustrates an exemplary "broadcast" tap record 280 that can be sent from the head end 4 to configure additional aspects of the cable system taps. The bytes contained in this tap record may contain information for configuring any desirable parameter of the taps, including the parameters described herein and any other parameters cable system operators may desire to change, thus illustrating the flexibility of the inventive system and method.

Accordingly, a system and method for controlling a plurality of broadband communication network switching units using minimal network transmission medium power, has been described. While various embodiments have been disclosed, it should be apparent that variations and alternative embodiments could be implemented in accordance with the invention. It is understood, therefore, that the invention is not to be in any way limited except in accordance with the spirit of the appended claims and their equivalents.

What is claimed is:

1. In a broadband telecommunication network including a plurality of microprocessor-controlled switching units controlling subscriber access to the network, a method for controlling said switching units from a central location using minimal network transmission medium power, comprising the steps of:

sending a repeating sequence of switching unit control messages from said central location across said network, each of said messages being addressed to an individual one of said switching units by way of a switching unit address contained in each message;

periodically powering each of said switching units from a low power (sleep) state to a higher power operational (wake) state in synchronization with a corresponding one of said control messages being sent from said central location, and thereafter returning said switching units to said sleep state;

said sleep state being implemented without microprocessor control by way of a programmable timer that is programmed at the end of each wake state to count for a programmed sleep period that is determined by calculation during said wake state;

said wake state being implemented with microprocessor control as a result of said timer asserting a wakeup signal at the end of said programmed sleep period; and said programmed sleep period being calculated by way of a computation that includes comparing a switching unit address received dung said wake state with a switching unit address assigned to said switching unit and adjusting said programmed sleep period if said received switching unit address differs from said assigned switching unit address by a predetermined threshold.

2. A method in accordance with claim 1 wherein the current consumption of said switching units during said sleep state is approximately 2–3 orders of magnitude less than the current consumption of said switching units during said wake state.

3. A method in accordance with claim 1 wherein said sleep state consumes substantially no current from said network.

4. A method in accordance with claim 1 wherein said switching units are powered into said wake, state each time a corresponding one of said control messages is sent from said central location.

5. A method in accordance with claim 4 wherein said switching units are powered into said wake state several control messages in advance of the corresponding one of said control messages and remain in said operational state until the corresponding one of said control messages is processed.

6. A method in accordance with claim 1 wherein not more than eight of said switching units are placed in said wake state at any given time.

7. A method in accordance with claim 1 wherein said switching units are powered by said network during said sleep state and said wake state.

8. A method in accordance with claim 1 wherein said switching units are self powered during said sleep state and powered by said network during said wake operational state.

9. A method in accordance with claim 1 wherein said switching units function during said sleep state by timing the arrival of a corresponding one of said control messages and then invoke said wake state.

10. A method in accordance with claim 9 wherein said switching units function during said wake state by:

(1) reading the addresses of said control messages until a corresponding one of said control messages is detected;

(2) processing said detected control message and taking responsive action if necessary;

(3) calculating said programmed sleep period as a time period until a subsequent corresponding one of said control messages will be sent; and (3) returning said switching unit to said sleep state to time the arrival of said subsequent control message using said calculated time period.

11. A method in accordance with claim 1 wherein said broadband communication network is a cable television distribution system, said central location is a head end, and said switching units are addressable taps connected to cable transmission lines carrying communications from said head end.

12. A method in accordance with claim 11 wherein said taps contain multiple switchable subscriber connection ports and wherein said control messages are tap records that include a field containing switch state information for each port in a tap.

13. In a cable television distribution system including (1) a head end, (2) at least one transmission line carrying communications from said head end, and (3) a plurality of taps connected to said transmission lines and containing switchable microprocessor-controlled ports connecting to cable subscribers, a low power system for controlling the switch state of said ports in said taps, comprising:

a tap record generating circuit in said head end for generating a repeating sequence of tap records, each tap record containing a tap address for identifying a specific one of said taps and containing information for controlling the switch state of said ports;

a tap control circuit in each of said taps, each tap circuit including a low power stage and a higher power stage;

said low power stage being implemented without microprocessor control by way of a programmable timer that is programed at the end of each wake state to count for a programmed sleep period that is determined by calculation during said wake state, said low power stage being configured to control said higher power stage by maintaining it in a sleep state until a corresponding tap record is about to be sent by said head end, and to wake up said higher power stage to process said tap record;

said higher power stage being implemented with microprocessor control as a result of said timer asserting a wakeup signal at the end of said programmed sleep period, said higher power stage being configured to read tap records as they arrive from said head end, to identify a corresponding tap record, to process said tap record by setting the switch state of said ports as necessary in response to said tap record, to calculate a time interval for reawakening, to provide said time interval to said low power stage, and to return itself to said sleep state;

said time interval being calculated by way of a computation that includes comparing a tap address received during said wake state with a tap address assigned to said tap and adjusting said time interval if said received tap address differs from said assigned tap address by it predetermined threshold.

14. An addressable tap for use in a cable television distribution system, comprising:

an input adapted to receive radio frequency and power signals from a cable plant;

a plurality of switchable tap ports adapted to selectively output a radio frequency signal received at said input;

a radio frequency receiver adapted to receive said radio frequency signal from said input, demodulate said radio frequency signal, and extract tap record data therefrom containing tap port switch settings;

a microprocessor controller adapted to receive said tap record data and control the selection of said switchable ports for radio frequency signal output based on tap records in said tap record data that are addressed to said addressable tap;

a power supply adapted to receive said power signal from said input and provide power to said microprocessor and said receiver;

a programmable timer circuit adapted to control power delivery from said power supply;

said timer circuit including a timer that is adapted to operate during a low power (sleep) state of said addressable tap without microprocessor control to periodically assert a timer output signal;

said timer output signal allowing power to be provided to said microprocessor so that said addressable tap is placed into a higher power operational (wake) state in which said addressable tap is under microprocessor control;

said microprocessor being further adapted to return to said sleep state after processing said tap record data by programming said timer circuit to assert a next timer output signal based on a wakeup interval calculated by said microprocessor during said wake state; and said wakeup interval being calculated by way of a computation that includes comparing a tap address received in a tap record during said wake state with a tap address corresponding to said addressable tap and adjusting said wakeup interval if said received tap address differs from said corresponding tap address by a predetermined threshold.

15. An addressable tap in accordance with claim 14 wherein said addressable tap is adapted to immediately enter said wake state following an interruption of said power signal from said cable plant.

16. An addressable tap in accordance with claim 15 wherein said power supply is adapted to detect said power signal interruption and output a power pulse signal to said timer circuit, and wherein said timer circuit is adapted to assert power to said microprocessor in response to said power pulse without regard to said timer output signal.

17. An addressable tap in accordance with claim 14 wherein said microprocessor is adapted to control power to said receiver.

18. An addressable tap in accordance with claim 14 wherein said microproccessor is adapted to control the frequency setting of said receiver.

19. An addressable tap in accordance with claim 14 wherein said microprocessor is programmed to check tap addresses in said tap record data to determine whether a tap address in said tap record data corresponds to said addressable tap, and if so, to process the tap record associated with said tap address.

20. An addressable tap in accordance with claim 19 wherein said microprocessor is programmed to detect space words in said tap records in order to distinguish between successive tap records.

21. An addressable tap in accordance with claim 19 wherein said microprocessor is programmed to compute a new wake up interval and return to said sleep state if said tap addresses being checked are less than the tap address corresponding to said addressable tap by a predetermined threshold and thereby indicating that said addressable tap has awoken too early, and to also return to said sleep state if said tap addresses being checked are greater than the tap address corresponding to said addressable tap and thereby indicating that said addressable tap has awoken too late.

22. An addressable tap in accordance with claim 19 wherein said microprocessor stores one or more of tap address information, tap data frequency information, tap port data, and tap mode data, Wherein said tap record data includes corresponding information, and wherein said tap record processing includes updating said stored information if it is changed in a tap record addressed to said addressable tap.

23. An addressable tap in accordance with claim 19 wherein said tap record processing includes setting said tap ports according to tap port switch settings in a tap record addressed to said addressable tap.

* * * * *